United States Patent Office 3,016,326
Patented Jan. 9, 1962

3,016,326
NEW ORGANIC PHOSPHORUS COMPOUNDS
Ernst Beriger, Allschwil, Switzerland, assignor to Ciba Limited, Basel, Switzerland, a Swiss company
No Drawing. Filed Dec. 6, 1960, Ser. No. 73,962
Claims priority, application Switzerland Dec. 9, 1959
24 Claims. (Cl. 167—22)

This invention provides organic phosphorus compounds of the general formula (1) 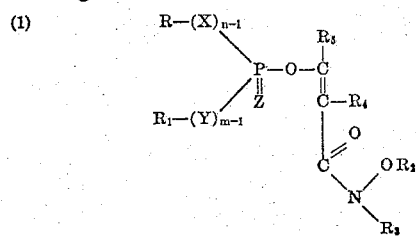

in which R and $R_1$ each represent a substituted or unsubstituted alkyl, cycloalkyl, aralkyl, aryl or heterocyclic radical or may together form part of a ring system, $R_2$ and $R_3$ each represent a lower alkyl radical, $R_4$ represents a hydrogen atom or an alkyl radical or a halogen atom, $R_5$ represents an aliphatic, alicyclic, aromatic or heterocyclic radical, X and Y each represent —O—, —S—, —NH— or

and Z represents an oxygen or sulfur atom, and $n$ and $m$ each represent the whole number 1 or 2.

The Formula 1 includes all the possible stereoisomers, especially the cis- and the corresponding trans-isomers.

The new compounds are valuable agents for combating pests, especially insect pests and acarids. They are active against the various stages of development, such as eggs, larvae and imagines, and they act as contact and stomach poisons.

Especially valuable as insecticides are compounds of the general formula (2) 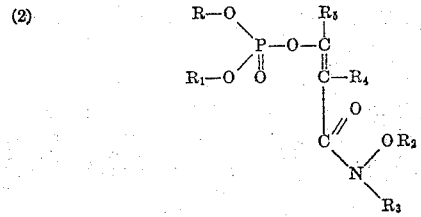

in which R and $R_1$ each represent an alkyl radical containing 1 to 4 carbon atoms, and advantageously a methyl or ethyl radical, $R_2$ and $R_3$ represent lower alkyl radicals, $R_4$ represents a hydrogen atom or a chlorine atom, and $R_5$ represents a lower alkyl radical, more especially a methyl radical or a substituted or unsubstituted phenyl radical.

The invention also provides a process for the manufacture of the compounds of the above Formula 1, wherein a compound of the formula (3) 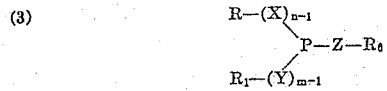

in which R, $R_1$, $n$, $m$, X, Y and Z have the meanings given above and $R_6$ represents an alkyl radical containing 1 to 4 carbon atoms, is condensed with a compound of the formula (4) 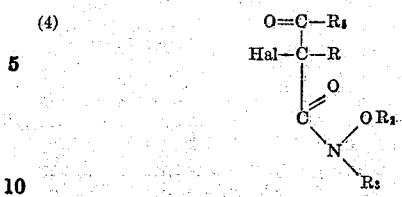

in which $R_2$, $R_3$, $R_4$ and $R_5$ have the meanings given above and "Hal" represents a halogen atom, such as bromine or preferably chlorine, the condensation being accompanied by the splitting off of a compound of the formula $R_6$ Hal.

The products of the invention can also be obtained by reacting a compound of the formula (5) 

in which R, $R_1$, $n$, $m$, X, Y and Z have the meanings given above and Me represents an alkali metal, such as sodium, with a compound of the Formula 4. For making compounds in which $R_4$ represents a hydrogen atom or an alkyl radical, the following condensation may be carried out:

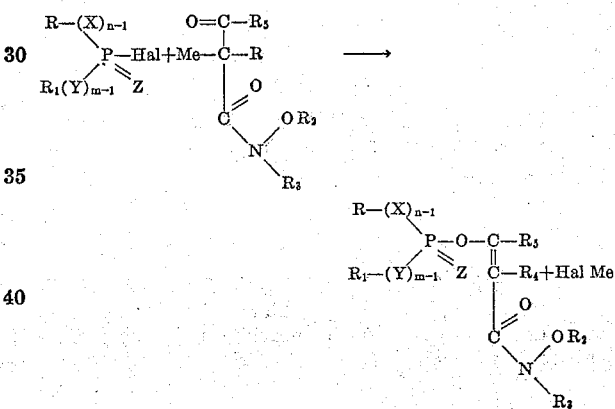

The compounds of the above Formula 3 used as starting materials are derivatives of trivalent phosphorus, whereas the products of the process of the invention are derivatives of pentavalent phosphorus. Among the compounds of the Formula 3 those in which X, Y and Z each represent an oxygen atom are the most easy to obtain. They correspond to the formula

and can be made by methods in themselves known.

The aliphatic radicals, which R and $R_1$ may represent may have straight or branched chains and may be saturated or unsaturated, and they may be substituted or unsubstituted. There may be mentioned, for example, the following groups: methyl, ethyl, propyl, isopropyl, butyl, hexyl, 2-ethyl-butyl, octyl, 2-butyl-octyl, dodecyl, octadecyl, allyl and 2-chloroethyl; and also such radicals containing thiocyano, cyano or ester groups. The radicals R and $R_1$ may be identical or different from each other. $R_6$ is advantageously an alkyl radical containing 1 to 4 carbon atoms. For example, there may be mentioned the following compounds: trimethyl phosphite, triethyl phosphite, tripropyl phosphite, diethyl dodecyl phosphite, tri-(2-chlorethyl)-phosphite and the ester of the formula

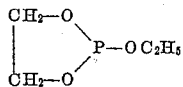

The aromatic radicals which R and $R_1$ may represent may be mononuclear or polynuclear and may contain nuclear substituents. There may be mentioned phenyl, 2- or 4-chlorophenyl, 2:4-dichlorophenyl, 4-methoxyphenyl, 4-nitrophenyl, naphthyl and 4-diphenyl groups. Thus, there may be used compounds such as 2:4-dichlorophenyl-diethylphosphite or 4-chlorophenyl-dimethylphosphite. There may also be mentioned compounds in which 1 or 2 radicals are bound to the phosphorus atom directly or through a carbon atom, for example, phenyl-phosphonous acid diethyl ester of the formula

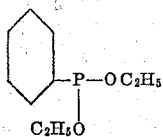

Among the araliphatic radicals which R and $R_1$ may represent, there may be mentioned the benzyl radical, and among the cycloaliphatic radicals the cyclohexyl radical and among the heterocyclic radicals the tetrahydrofurfuryl. Starting materials containing such radicals R, for example, cyclohexyl diethyl phosphite, tetrahydrofurfuryl dimethyl phosphite and dibenzyl propyl phosphite. Among compounds in which X and Y each represent a sulfur atom there may be mentioned triethyl thiophosphite of the formula

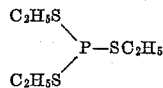

and among those in which X and Y each represent a nitrogen atom, for example, the compounds of the formula

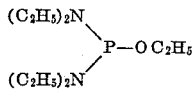

Compounds of the above Formula 5 are salts of disubstituted phosphites or phosphinic acids, for example, the sodium salt of dimethyl phosphite and diethyl phosphite of dodecylethyl phosphite, cyclohexylmethyl phosphite, tetrahydrofurfuryl ethyl phosphite or of benzyl ethyl phosphite.

The compounds of the general formula

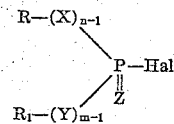

are phosphoric acid monohalides, for example, phosphoric acid diethyl ester monochloride, thiophosphoric acid diethyl ester monochloride or bis-dimethylamidophosphoric acid monochloride.

The compounds of the general formula

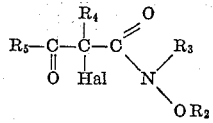

are N:O-dialkyl-hydroxylamides of halogenated acyl-acetic acids, especially acetoacetic, benzoyl acetic, hexahydrobenzoyl acetic, furoyl acetic or tetrahydrofuroyl acetic acid, derived from aliphatic, alicyclic, aromatic or heterocyclic carboxylic acids.

For making the compounds of the invention the reactants are heated at a raised temperature, for example, within the range of 50° C. to 200° C., and advantageously about 90° C. to 150° C. It may be of advantage to use an inert solvent, such as benzene, toluene, xylene, chlorobenzene or benzine, and if desired, to work in an atmosphere of an inert gas, for example, under nitrogen and/or under reduced pressure. As stated above, the compounds of the invention are valuable agents for combating pests, especially as insecticides and acaricides.

The invention also provides preparations for combating pests which comprise a compound of the invention as active substance in admixture with a carrier and comprises a method for combating pests with such preparations. Especially advantageous are compounds of the above Formula 2.

The compounds of the invention can be used for protecting a very wide variety of materials against pests or harmful insects or acarids, and gaseous, liquid or solid substances may be used as carriers for the active substance. As such materials to be protected or to be used as carriers there may be mentioned, for example, air, especially in rooms, liquids, for example, water in ponds and finally dead or living solid substrata, for example, objects in living rooms, cellars, attics, stables and also pelts, feathers, wool or the like, and also living organisms of the vegetable and animal kingdoms in their very wide variety of stages of development, and provided that they are insensitive to the pest combating agents.

Pests can be combatted with active substances of the invention by the usual methods, for example, by treating the material to be protected with the active substance in the form of vapor, for example, as a fumigating agent or in the form of a dusting or spraying preparation, for example, solution or suspension prepared with water or a suitable organic solvent, for example, alcohol, petroleum, a tar distillate or the like. There may also be used solutions or aqueous emulsions of organic solvents which contain the active substance and serve for protecting materials or objects by brushing, spraying or dipping.

The spraying or dusting preparations may contain the usual inert fillers or melting agents, for example, kaolin, gypsum or bentonite or other additions, such as sulfite cellulose waste liquor, cellulose derivatives or the like, and also the usual wetting agents or adhesive agents for improving the wetting capacity and adhesive properties of the preparations. The preparations may be made up in powdered form, in the form of aqueous dispersions or pastes, or in the form of self-dispersing oils.

The compounds may be present in the preparations as the sole active substance or in admixture with other insecticides or fungicides. The use of such preparations for plant protection may be carried out by the usual spraying, casting, dusting or fumigating methods.

The following examples illustrate the invention, the parts and percentages being by weight unless otherwise stated and the relationship of parts by weight to parts by volume being the same as that of the kilogram to the liter.

EXAMPLE 1

A mixture of 17.25 parts of α-monochloroacetoacetic acid-O:N-dimethyl hydroxylamide and 25 parts by volume of chlorobenzene is heated to 130–140° C. and then treated dropwise with 13.12 parts of trimethyl phosphite. To allow the reaction to reach completion, the mixture is further heated for 1 hour at 130–140° C., by which time 4.1 parts of methyl chloride have been collected in a cooled receptacle. The volatile constituents are removed in vacuo, to leave as residue 23.05 parts of the compound of the formula

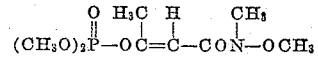

boiling at 115–120° C. under a pressure of 0.02 mm. Hg.

*Analysis.*—Calculated: P, 12.23%. Found: P, 12.00%.

The acetoacetic acid-O:N-dimethyl hydroxylamide used as intermediate is obtained in simple manner from diketene and O:N-dimethyl hydroxylamine. B.P. 84° C. under 0.5 mm. Hg pressure.

EXAMPLE 2

As described in Example 1, 17.25 parts of α-monochloro-acetoacetic acid-O:N-dimethyl hydroxylamide are reacted in 25 parts by volume of chlorobenzene with 17.55 parts of triethyl phosphite, to yield 25.9 parts of a compound of the formula $$(C_2H_5O)_2\overset{O}{\underset{\|}{P}}-O\overset{H_2C}{\underset{\|}{C}}=\overset{H}{\underset{|}{C}}-CO\overset{CH_3}{\underset{|}{N}}-OCH_3$$

boiling at 120–126° C. under 0.05 mm. Hg pressure.

EXAMPLE 3

As described in Example 1, 19.7 parts of α:α-dichloro-acetoacetic acid-O:N-dimethyl hydroxylamide are reacted in 25 parts by volume of chlorobenzene with 12.58 parts of trimethyl phosphite, to yield 23.5 parts of a compound of the formula $$(CH_3O)_2\overset{O}{\underset{\|}{P}}-O\overset{H_3C}{\underset{\|}{C}}=\overset{Cl}{\underset{|}{C}}-CO\overset{CH_3}{\underset{|}{N}}-OCH_3$$

boiling at 130–136° C. under 0.02 mm. Hg pressure.

*Analysis.*—Calculated: P, 10.77%. Found: P, 11.10%.

EXAMPLE 4

As described in Example 1, 19.7 parts of α:α-dichloracetoacetic acid-O:N-dimethyl hydroxylamide are reacted in 25 parts by volume of chlorobenzene with 16.8 parts of triethyl phosphite, to yield 26.5 parts of a compound of the formula $$(C_2H_5O)_2\overset{O}{\underset{\|}{P}}-O\overset{H_3C}{\underset{\|}{C}}=\overset{Cl}{\underset{|}{C}}-CO\overset{CH_3}{\underset{|}{N}}-OCH_3$$

boiling at 131–135° C. under 0.02 mm. Hg pressure.

EXAMPLE 5

A mixture of 15.3 parts of α-monochloroacetoacetic acid-O:N-diethyl hydroxylamide and 30 parts by volume of chlorobenzene is heated to the boil and treated dropwise with 11 parts of trimethyl phosphite. To complete the reaction, the mixture is heated for another hour at 130–140° C., by which time 3.1 parts of methyl chloride have been collected in a cooled receptacle. The volatile constituents are removed in vacuo, to leave as residue 19.2 parts of a compound of the formula $$(CH_3O)_2\overset{O}{\underset{\|}{P}}-O\overset{H_3C}{\underset{\|}{C}}=\overset{H}{\underset{|}{C}}-CO\overset{C_2H_5}{\underset{|}{N}}-OC_2H_5$$

boiling at 115° C. under 0.01 mm. Hg pressure.

*Analysis.*—Calculated: P, 11.02%. Found: P, 11.20%.

The acetoacetic acid-O:N-diethyl hydroxylamide used as intermediate is obtained in simple manner from diketene and O:N-diethyl hydroxylamine. B.P. 82–83° C. under 0.2 mm. Hg pressure.

EXAMPLE 6

As described in Example 5, 15.3 parts of α-monochloro-acetoacetic acid-O:N-diethyl hydroxylamide are reacted in 30 parts by volume of chlorobenzene with 14.7 parts of triethyl phosphite, to yield 21.6 parts of a compound of the formula $$(C_2H_5O)_2\overset{O}{\underset{\|}{P}}-O\overset{H_3C}{\underset{\|}{C}}=\overset{H}{\underset{|}{C}}-CO\overset{C_2H_5}{\underset{|}{N}}-OC_2H_5$$

boiling at 140° C. under 0.01 mm. Hg pressure.

*Analysis.*—Calculated: P, 10.01%. Found: P, 10.00%.

EXAMPLE 7

As described in Example 5, 18.2 parts of α:α-dichloro-acetoacetic acid-O:N-diethyl hydroxylamide are reacted in 30 parts by volume of chlorobenzene with 11.2 parts of trimethyl phosphite, to yield 23.95 parts of a compound of the formula $$(CH_3O)_2\overset{O}{\underset{\|}{P}}-O\overset{H_3C}{\underset{\|}{C}}=\overset{Cl}{\underset{|}{C}}-CO\overset{C_2H_5}{\underset{|}{N}}-OC_2H_5$$

which decomposes when it is attempted to distil it in a high vacuum.

*Analysis.*—Calculated: P, 9.81%. Found: P, 7.80%.

EXAMPLE 8

As described in Example 5, 18.2 parts of α:α-dichloroacetoacetic acid-O:N-diethyl hydroxylamide are reacted in 30 parts by volume of chlorobenzene with 14.9 parts of triethyl phosphite, to yield 26.3 parts of a compound of the formula $$(C_2H_5O)_2\overset{O}{\underset{\|}{P}}-O\overset{H_3C}{\underset{\|}{C}}=\overset{Cl}{\underset{|}{C}}-CO\overset{C_2H_5}{\underset{|}{N}}-OC_2H_5$$

which decomposes when it is attempted to distil it in a high vacuum.

*Analysis.*—Calculated: P, 9.01%. Found: P, 9.30%.

EXAMPLE 9

As described in Example 5, 13.2 parts of α-monochloroacetoacetic acid-O-methyl-N-isopropyl hydroxylamide in 20 parts by volume of chlorobenzene are reacted with 8.7 parts of trimethyl phosphite, to yield 16.7 parts of a compound of the formula $$(CH_3O)_2\overset{O}{\underset{\|}{P}}-O\overset{H_3C}{\underset{\|}{C}}=\overset{H}{\underset{|}{C}}-CO\overset{C_3H_7(iso)}{\underset{|}{N}}-OCH_3$$

*Analysis.*—Calculated: P, 11.02%. Found: P, 10.60%.

The acetoacetic acid-O-methyl-N-isopropyl hydroxylamide used as intermediate is obtained in simple manner from diketene and O-methyl-N-isopropyl hydroxylamine. B.P. 65° C. under 0.1 mm. Hg pressure.

EXAMPLE 10

As described in Example 5, 13.2 parts of α-monochloroacetoacetic acid-O-methyl-N-isopropyl hydroxylamide are reacted in 20 parts by volume of chlorobenzene with 11.6 parts of triethyl phosphite, to yield 19.3 parts of a compound of the formula $$(C_2H_5O)_2\overset{O}{\underset{\|}{P}}-O\overset{H_3C}{\underset{\|}{C}}=\overset{H}{\underset{|}{C}}-CO\overset{C_3H_7(iso)}{\underset{|}{N}}-OCH_3$$

*Analysis.*—Calculated: P, 10.01%. Found: P, 10.00%.

EXAMPLE 11

As described in Example 5, 15.9 parts of α:α-dichloroacetoacetic acid-O-methyl-N-isopropyl hydroxylamide are reacted in 20 parts by volume of chlorobenzene with 8.95 parts of trimethyl phosphite, to yield 19.7 parts of a compound of the formula $$(CH_3O)_2\overset{O}{\underset{\|}{P}}-O\overset{H_3C}{\underset{\|}{C}}=\overset{Cl}{\underset{|}{C}}-CO\overset{C_3H_7(iso)}{\underset{|}{N}}-OCH_3$$

*Analysis.*—Calculated: P, 9.81%. Found: P, 9.20%.

EXAMPLE 12

As described in Example 5, 15.9 parts of α:α-dichloroacetic acid-O-methyl-N-isopropyl hydroxylamide are reacted in 20 parts by volume of chlorobenzene with 12.0 parts of triethyl phosphite, to yield 21.8 parts of a compound of the formula $$(C_2H_5O)_2\overset{O}{\underset{\|}{P}}-O\overset{H_3C}{\underset{\|}{C}}=\overset{Cl}{\underset{|}{C}}-CO\overset{C_3H_7(iso)}{\underset{|}{N}}-OCH_3$$

*Analysis.*—Calculated: P, 9.01%. Found: P, 9.10%.

EXAMPLE 13

As described in Example 5, 17.95 parts of α-monochloroacetoacetic acid-O:N-dimethyl hydroxylamide are reacted in 30 parts by volume of chlorobenzene with 22.3 parts of triisopropyl phosphite, to yield 27.8 parts of a compound of the formula

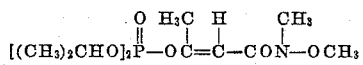

Analysis.—Calculated: P, 10.0%. Found: P, 9.9%.

When it is attempted to distil it in a high vacuum, the compound decomposes.

EXAMPLE 14

As described in Example 5, 21.4 parts of α:α-dichloroacetoacetic acid-O:N-dimethyl hydroxylamide are reacted in 30 parts by volume of chlorobenzene with 22.3 parts of triisopropyl phosphite, to yield 32.9 parts of a compound of the formula

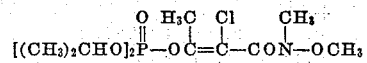

Analysis.—Calculated: P, 9.01%. Found: P, 9.00%.
When it is attempted to distil it in a high vacuum, the compound decomposes.

EXAMPLE 15

2 parts of a condensation product obtained as described in any one of Examples 1 to 13 are mixed with 1 part of the condensation product from 1 molecular proportion of tertiary octylphenol and 8 molecular proportions of ethylene oxide and 7 parts of isopropanol. A clear solution is obtained which may be used as a liquid spray concentrate and can be emulsified by being poured into water.

(A) To examine its contact effect on aphids, the following experiment was carried out with the use of liquid sprays containing respectively, 0.08%, 0.04%, 0.02% and 0.01% of active principle.

Broad beans, strongly infested with aphids, were sprayed all over and after 48 hours the effect achieved was examined. When a 100% effect was achieved, the plants were re-infested with fresh aphids and the effect was checked after another period of 48 hours. The results thus obtained are summarized in the following Table I:

Table I
EFFECT ON APHIDS AFTER 48 HOURS

| Concentr. of liquid spray, percent | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| 0.08 | ++ | ++ | ++ | ++ | ++ | ++ | ++ | ++ | ++ | ++ | ++ | ++ |
| 0.04 | ++ | ++ | ++ | ++ | ++ | ++ | ++ | ++ | ++ | ++ | ++ | ++ |
| 0.02 | ++ | ++ | ++ | ++ | ++ | ++ | ++ | ++ | ++ | ++ | ++ | ++ |
| 0.01 | ++ | ++ | ++ | ++ | ++ | ++ | ++ | ++ | ++ | ++ | ++ | ++ |

48 HOURS AFTER RE-INFESTATION

| Concentr. of liquid spray, percent | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| 0.08 | ++ | ++ | ++ | ++ | ++ | ++ | ++ | ++ | ++ | ++ | ++ | ++ |
| 0.04 | ++ | ++ | ++ | ++ | ++ | ++ | ++ | ++ | ++ | ++ | ++ | ++ |
| 0.02 | ++ | ++ | ++ | ++ | ++ | +/ | +/ | +/ | ++ | ++ | ++ | ++ |
| 0.01 | ++ | ++ | ++ | ++ | ++ | -- | -- | // | ++ | +/ | ++ | ++ |

For each plant a symbol was used, namely:
+ signifies that no living aphids were left
— signifies unsatisfactory or no effect
/ signifies good effect, only a few living aphids left.

(B) To examine the effect on aphids by diffusion through the leaves the following experiment was conducted with the use of liquid sprays containing, respectively, 0.08%, 0.04%, 0.02% and 0.01% of active principle.

Broad beans, the leaves of which were infested on the underside with aphids, were sprayed only on the upper surface of the leaves with the aforementioned liquid sprays, and after 48 hours the effect on the underside of the leaves was examined. The results thus obtained are summarized in the following Table II.

Table II
EFFECT ON APHIDS

| Concentr. of liquid spray, percent | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| 0.08 | ++++ | ++++ | ++++ | ++++ | ++++ | ++++ | ++++ | ++++ | ++++ | ++++ | ++++ | ++++ |
| 0.04 | ++++ | ++++ | ++++ | ++++ | ++++ | ++++ | ++++ | ++++ | ++++ | ++++ | ++++ | ++++ |
| 0.02 | ++++ | ++++ | ++++ | ++++ | ++++ | ++++ | ++++ | ++++ | ++++ | ++++ | ++++ | ++++ |
| 0.01 | ++++ | ++// | ++++ | ++++ | ++++ | ---- | //-- | ++// | ++++ | +/// | ++++ | ++++ |

(C) To examine the so-called systemic action, the following experiment was conducted with liquid sprays containing, respectively, 0.08%, 0.04%, 0.02% and 0.01% of active principle.

From broad beans (Vivia fabae) which were strongly infested with aphids (Doralis fabae), the bottom leaves were removed and a color mark was made halfway up the stem. The lower halves of the stems of 2 plants each were sprayed with the liquid sprays of the concentrations mentioned above. After 48 hours the effect of the spraying was checked on the upper, unsprayed halves of the plants. The results thus obtained are summarized in Table III.

Table III
EFFECT ON APHIDS AFTER 48 HOURS

| Concentr. of liquid spray, percent | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| 0.08 | ++ | ++ | ++ | ++ | ++ | ++ | ++ | ++ | ++ | ++ | ++ | ++ |
| 0.04 | ++ | ++ | ++ | ++ | ++ | ++ | ++ | +/ | +/ | +/ | ++ | ++ |
| 0.02 | ++ | ++ | +/ | +/ | ++ | -- | // | // | -- | -/ | +/ | +/ |
| 0.01 | ++ | ++ | +/ | +/ | ++ | -- | /- | // | -- | -- | +/ | +/ |

The compounds obtained in Examples 1 to 6 and 8 to 12 display a good to very good acaricidal effect on the red spinner mite *Tetranychus urticae*, and the compounds 1 to 12 are efficient stomach poisons in the case of *Musca domestica, Carausius morosus, Orgyia gonostigma* and *Gastroidea viridula*.

If desired, spray concentrates can also be prepared with wetting agents and emulsifiers other than those mentioned above. There are suitable non-ionic substances, for example condensation products of aliphatic alcohols, amines or carboxylic acids containing a long-chain hydrocarbon residue of about 10 to 30 carbon atoms with ethylene oxide, such as the condensation products of octadecyl alcohol with 25 to 30 mols of ethylene oxide, or soybean fatty acid with 30 mols of ethylene oxide, or commercial oleylamine with 15 mols of ethylene oxide, or dodecylmercaptan with 12 mols of ethylene oxide. Among suitable anionic emulsifiers there may be mentioned the sodium salt of dodecyl alcohol sulfonic acid ester, sodium salt of dodecyl benzenesulfonic acid, potassium or triethanolamine salt of oleic or abietic acid or of mixtures of said acids, or the sodium salt of a petroleum sulfonic acid.

Instead of isopropanol there may be used other solvents for the preparation of liquid spray concentrates, for example ethanol, methanol, butanol, acetone, methylethyl ketone, methylcyclohexanol, benzene, toluene, xylene, kerosenes or petroleum fractions. Mixtures of two or more solvents can, of course, likewise be used.

EXAMPLE 16

2 parts of one of the condensation products according to Examples 1 to 6, 9 or 10 are mixed with 9 parts of chalk and 1 part of wetting agent. A spray powder is obtained from which liquid spray can be prepared by suspending it in water. When the walls of stables are treated with such a liquid spray containing 0.04% of active principle, good results are obtained in combating flies and midges.

What is claimed is:

1. An organic phosphorus compound which is represented by the general formula

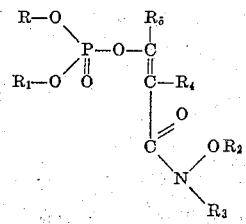

in which R and $R_1$ each represent an alkyl radical containing 1 to 18 carbon atoms, $R_2$ and $R_3$ each represent a lower alkyl radical, $R_4$ represents a member selected from the group consisting of a hydrogen atom, a lower alkyl radical and a chlorine atom and $R_5$ represents a lower alkyl radical.

2. An organic phosphorus compound which is represented by the general formula

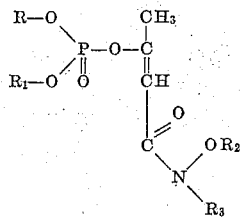

in which R, $R_1$, $R_2$ and $R_3$ each represent an alkyl radical containing 1 to 3 carbon atoms.

3. The compound of the formula

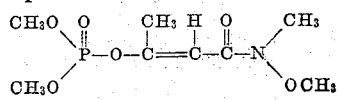

4. The compound of the formula

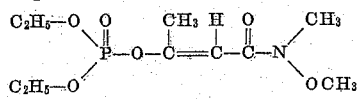

5. The compound of the formula

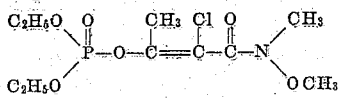

6. The compound of the formula

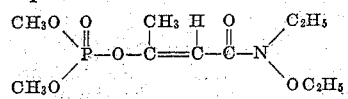

7. The compound of the formula

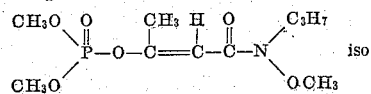

8. A preparation for combating insects and acarids which comprises in admixture with an inert and compatible carrier an organic phosphorus compound of the general formula

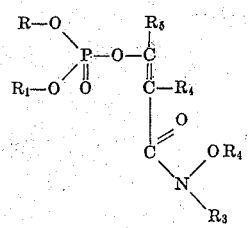

in which R and $R_1$ each represent an alkyl radical containing 1 to 18 carbon atoms, $R_2$ and $R_3$ each represent a lower alkyl radical, $R_4$ represents a member selected from the group consisting of a hydrogen atom, a lower alkyl radical and a chlorine atom and $R_5$ represents a lower alkyl radical.

9. A preparation for combating insects and acarids which comprises in admixture with an inert and compatible carrier an organic phosphorus compound of the general formula

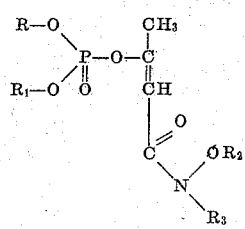

in which R, $R_1$, $R_2$ and $R_3$ each represent an alkyl radical containing 1 to 3 carbon atoms.

10. A preparation for combating insects and acarids which comprises in admixture with an inert and compatible carrier the compound of the formula

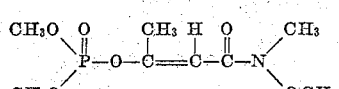

11. A preparation for combating insects and acarids which comprises in admixture with an inert and compatible carrier the compound of the formula

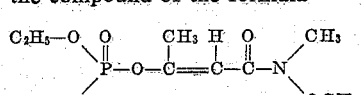

12. A preparation for combating insects and acarids which comprises in admixture with an inert and compatible carrier the compound of the formula

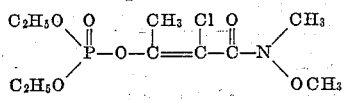

13. A preparation for combating insects and acarids which comprises in admixture with an inert and compatible carrier the compound of the formula

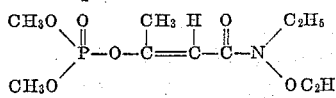

14. A preparation for combating insects and acarids which comprises in admixture with an inert and compatible carrier the compound of the formula

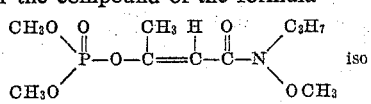

15. The method of controlling insects and acarids on plants, which comprises applying to plants that are subject to attack by said pests in insecticidal and acaricidal amount of an organic phosphorus compound which is represented by the general formula

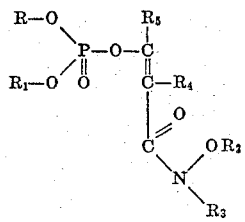

in which R and $R_1$ each represent an alkyl radical containing 1 to 18 carbon atoms $R_2$ and $R_3$ each represent a lower alkyl radical, $R_4$ represents a member selected from the group consisting of a hydrogen atom, a lower alkyl radical and a chlorine atom and $R_5$ represents a lower alkyl radical.

16. The method of controlling insects and acarids on plants, which comprises applying to plants that are subject to attack by said pests in insecticidal and acaricidal amount of an organic phosphorus compound which is represented by the general formula

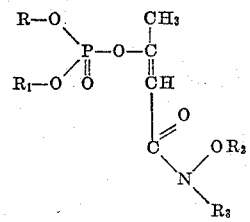

in which R, $R_1$, $R_2$ and $R_3$ each represent an alkyl radical containing 1 to 3 carbon atoms.

17. The method of controlling insects and acarids on plants, which comprises applying to plants that are subject to attack by insects and acarids a pesticidal amount of the compound of the formula

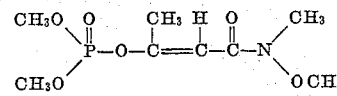

18. The method of controlling insects and acarids on plants, which comprises applying to plants that are subject to attack by said pests in insecticidal and acaricidal amount of the compound of the formula

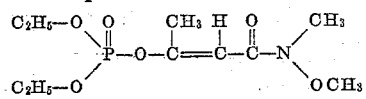

19. The method of controlling insects and acarids on plants, which comprises applying to plants that are subject to attack by said pests in insecticidal and acaricidal amount of the compound of the formula

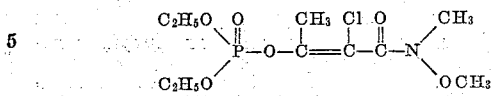

20. The method of controlling insects and acarids on plants, which comprises applying to plants that are subject to attack by pests in insecticidal and acaricidal amount of the compound of the formula

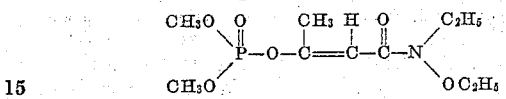

21. The method of controlling insects and acarids on plants, which comprises applying to plants that are subject to attack by said pests in insecticidal and acaricidal amount of the compound of the formula

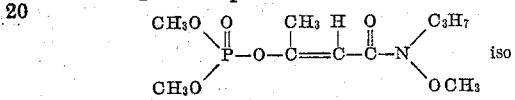

22. An organic phosphorus compound which is represented by the general formula

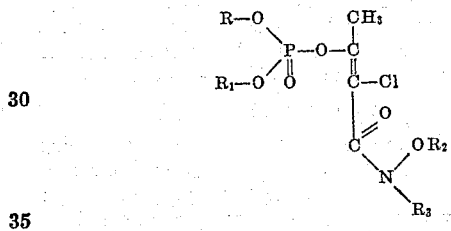

in which R, $R_1$, $R_2$ and $R_3$ each represent an alkyl radical containing 1 to 3 carbon atoms.

23. A preparation for combating insects and acarids which comprises in admixture with an inert and compatible carrier an organic phosphorus compound of the general formula

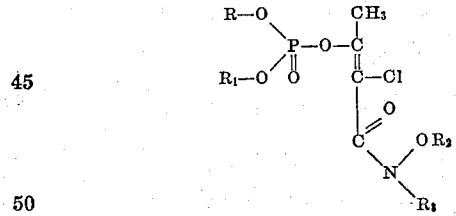

in which R, $R_1$, $R_2$ and $R_3$ each represent an alkyl radical containing 1 to 3 carbon atoms.

24. The method of controlling insects and acarids on plants, which comprises applying to plants that are subject to attack by said pests an insecticidal and acaricidal amount of an organic phosphorus compound which is represented by the general formula

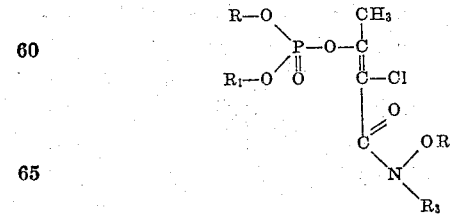

in which R, $R_1$, $R_2$ and $R_3$ each represent an alkyl radical containing 1 to 3 carbon atoms.

References Cited in the file of this patent

UNITED STATES PATENTS

| | | |
|---|---|---|
| 2,802,855 | Whetstone et al. | Aug. 13, 1957 |
| 2,943,975 | Metivier | July 5, 1960 |

UNITED STATES PATENT OFFICE
CERTIFICATION OF CORRECTION

Patent No. 3,016,326                                January 9, 1962

Ernst Beriger

It is hereby certified that error appears in the above numbered patent requiring correction and that the said Letters Patent should read as corrected below.

Column 3, line 30, for "R," read -- R, are --; column 5, lines 21 to 23, the formula should appear as shown below instead of as in the patent:

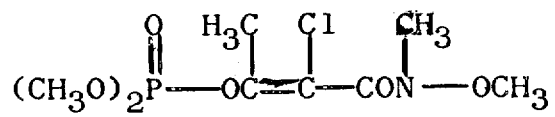

column 11, lines 24, 44, and 69, and column 12, lines 2, 10, and 18, for "in", each occurrence, read -- an --.

Signed and sealed this 25th day of September 1962.

(SEAL)
Attest:

ERNEST W. SWIDER                                    DAVID L. LADD
Attesting Officer                                       Commissioner of Patents